UNITED STATES PATENT OFFICE.

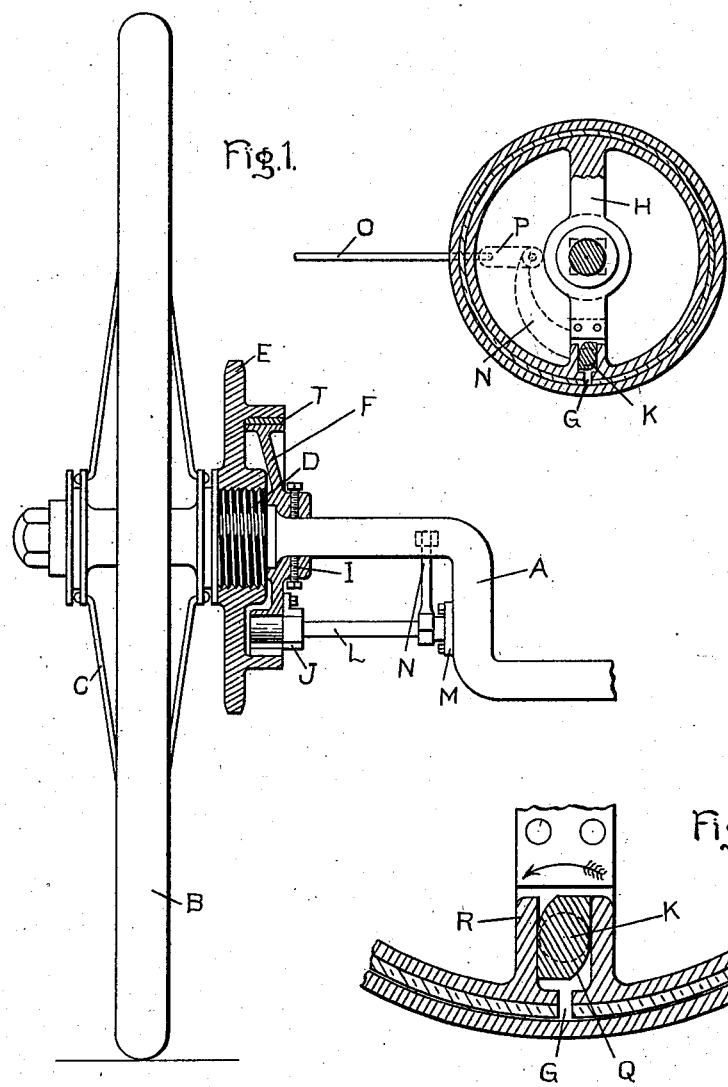

HERMANN LEMP, OF LYNN, MASSACHUSETTS, ASSIGNOR TO ELIHU THOMSON, OF SWAMPSCOTT, MASSACHUSETTS.

BRAKE FOR VEHICLES.

SPECIFICATION forming part of Letters Patent No. 692,878, dated February 11, 1902.

Original application filed February 28, 1900, Serial No. 6,805. Divided and this application filed February 7, 1901. Serial No. 46,313. (No model.)

*To all whom it may concern:*

Be it known that I, HERMANN LEMP, a citizen of the United States, residing at Lynn, in the county of Essex, State of Massachusetts, have invented certain new and useful Improvements in Brakes for Vehicles, (Case No. 2,018,) of which the following is a specification.

The present application is a division of my pending application, Serial No. 6,805, filed February 28, 1900, which division is made in accordance with the requirements of the United States Patent Office under the provisions of Rules 41 and 42.

In self-propelled vehicles it is necessary to have a mechanical brake and one which can be depended upon at all times, whether the vehicle is moving forward or backward.

My invention has for its object to provide a simple and reliable brake and one which is capable of quickly arresting movement of the vehicle whether it is traveling in a forward or backward direction and this with a small effort on the part of the operator.

In the accompanying drawings, which illustrate an embodiment of my invention, Figure 1 is a partial view of the axle of an automobile, showing the brake in vertical section. Fig. 2 is also a vertical section of the brake, taken at right angles to the view of Fig. 1; and Fig. 3 is an enlarged detail view of the means employed for actuating the brake.

A represents the fixed axle of the vehicle, which is provided with offset portions on which are mounted the driving-wheels B. In the drawings only one driving-wheel is shown; but it is to be understood that a corresponding wheel is employed on the other end of the axle and is correspondingly supported. The wheels may be of any suitable construction, the one shown consisting of an ordinary pneumatic wheel having the usual metal spokes C. The hub of the wheel is provided with a screw-threaded projection D, on which is mounted the driving-sprocket E. The latter is provided with an outwardly-extending circular flange which forms the moving element of the brake. The second or stationary element of the brake consists of a split-ring-like structure F, which is rigidly mounted on the fixed axle A. The ring is split, as indicated at G. Formed integral with the ring or otherwise secured thereto is a support H, which support has an enlargement forming a hub. The hub is provided with set-screws I, by means of which the split ring as a whole can be adjusted toward or away from the vertical web of the sprocket-wheel. The supporting-piece H is extended below the hub, and mounted thereon is a detachable bearing J for the shaft L, which shaft forms a support for the actuator K. The right-hand end of the shaft L is supported in a bearing M, that is secured to the offset portion of the axle A. Rigidly secured to the shaft L is an arm N, to which is connected a rod or other actuating device O by means of a link P. The actuator K is substantially rectangular and is provided with two curved or cut-away portions Q, which engage with the projections R, that are formed on the adjacent ends of the split-ring or brake member. Between the stationary brake member F and the flange on the sprocket E is located a thin strip T of leather or other similar material. This leather may be secured to the moving or to the stationary element of the brake, as desired.

In applying the brake the brake-rod O is placed under tension. This causes the actuator A to spread the ends of the ring, and since the friction between the flange and the split ring, due to either forward or backward movement of the wheel, tends to increase so long as the parts are moving, very little effort is required to set the brakes. It will be seen that the structure works equally well with forward or backward running. I have shown only one brake; but it is to be understood that two or more brakes may be applied to the same vehicle, if desired.

What I claim as new, and desire to secure by Letters Patent of the United States, is—

1. In a brake for vehicles, the combination of a wheel having a flange, a split ring having a hub formed integral therewith which hub is secured to a fixed part of the vehicle-frame, one half of the split rim acting as a brake when the vehicle is running in one direction, and so set that the movement of the wheel tends to increase the friction, the other half being correspondingly set and acting when the wheel moves in the opposite direction, a common actuator for pressing the parts of the split ring against the flange which is operative in both the forward and backward movement of the vehicle, and a bearing for the actuator which is secured to the hub.

2. In a motion-arresting device the combination of the rotating element, a split ring arranged to engage with the element, a hub formed integral with the ring, projections secured to the ends of the ring adjacent to the split, and an actuator mounted between the projections and arranged to engage therewith when rotated.

3. In a vehicle, the combination of an axle having an offset portion, a wheel-hub having an inwardly-extending flange, a split ring rigidly secured to the axle and fitting into the hub-flange, an actuator, a shaft therefor, a bearing for the shaft secured to the split ring, and a second bearing for the shaft which is secured to the axle.

4. In a vehicle, the combination of an axle having an offset portion, a wheel-hub having an inwardly-extending flange, a split ring rigidly secured to the axle and fitting into the hub-flange, a friction-band between the pulley and the hub-flange, an actuator having two corresponding faces, which faces engage with adjacent ends of the split ring for expanding it, a shaft extending parallel with the axle and connected to the actuator, and a lever for rotating the shaft.

5. In a motion-arresting device, the combination of a wheel, a flange secured thereto, an axle, a split ring, a hub formed integral therewith, an actuator located between the ends of the split ring and arranged to engage with both of them when moved, a bearing for the actuator mounted on an extension of the hub, a second bearing therefor mounted on the axle, and a lever for moving the actuator.

In witness whereof I have hereunto set my hand this 4th day of February, 1901.

HERMANN LEMP.

Witnesses:
DUGALD MCK. MCKILLOP,
JOHN J. WALKER.